Patented Feb. 13, 1945

2,369,502

UNITED STATES PATENT OFFICE 2,369,502

FRICTION MATERIAL

Frederick S. Walker, Bridgeport, Conn., assignor to Raybestos-Manhattan, Inc., Passaic, N. J., a corporation of New Jersey No Drawing. Application March 7, 1940, Serial No. 322,759

8 Claims. (Cl. 106—36)

This invention relates to improvements in friction materials and refers specifically to friction materials comprising metal or metal powders as an essential ingredient, the friction element being characterized in that it has a relatively low specific gravity; has a uniformly high wear resistance; can be constructed with friction coefficients covering a wide range and has a relatively high tensile strength.

Friction materials for automotive use, such as for clutch facings and brake linings, have lagged behind and not kept pace with their associated fields in development. With the introduction of the rear engine drive, and with high speeds and heavy loads, friction materials have become overloaded and short life and drum and plate scoring are all too common. This also applies to friction materials used for industrial purposes, such as heavy duty clutches, oil well brakes and the like.

It has heretofore been proposed to develop the potentialities of metal in friction material. However, friction materials having a substantial metal content have had indifferent success. One form of friction material heretofore proposed comprises a mixture of powdered metals, either with or without non-metallic additions (not used as a binder) which is compressed in a mold under high pressure of the order of 30,000 pounds per square inch or higher. The compressed element is then sintered in an atmosphere of inert gas at a temperature somewhat under the melting point of the higher melting constituent and somewhat above the melting point of the lower melting constituent. With the metals selected, one or more are intersoluble and a more or less true alloy is formed. This type of friction material is high in specific gravity, not unusually low in wear rate, low in coefficient of friction, and the more successful ones low in tensile strength.

The use of metal in various friction materials is broadly old in the art. It has been added to the conventional friction materials as a lubricant, a heat conductor, a scavenger, a coolant by virtue of phase changes and for various other purposes. In the prior art the efforts have usually been directed toward improving the properties of conventional materials composed of an organic binder, inorganic fillers and a fibrous material, usually asbestos, by metallic additions usually small in amount, although low melting metals such as lead have been proposed in various amounts, but their use is obviously restricted in quantity because of their low melting point.

As a feature of my invention we contemplate the incorporation of metal, preferably in powdered form, with a conventional non-metallic binder, the metal being relatively ductile and having a relatively high melting point. I have found that when metal is employed in excess of approximately 40% by weight entirely new and unexpected results are obtained. By "metal" is meant a single metal or a combination of metals. At about 40% metal content, depending to a degree on the metal, the metal phase will predominate and the friction material will partake of the properties of the metal employed. This fact is visibly demonstrated after short usage as a friction material by examining the working surface of the element, which becomes substantially metallic in appearance. In addition, the frictional characteristics are improved; the frictional coefficient characteristics are stable, and the heat conductance of the frictional material is raised, being relatively uniform over the entire area of the friction material.

If metal is used in quantities appreciably below about 40% by weight of the friction material mix, difficulty will not only be encountered in the formation of said metallic film, but the film will be discontinuous, "spotty" and non-uniform and the working face of the material will not have the characteristic metallic appearance of my friction material. In addition, the frictional and other physical characteristics of the material will be irregular, unstable and the action of the material in service will be unpredictable.

The broadest concept of my invention and the simplest form of our friction material comprises a powdered, relatively ductile metal having a melting point of approximately 1,000° F., or above, and a non-metallic binder, the metal being present in quantities of approximately 40 percent by weight or above. However, other materials may be incorporated with the mixture, if desired, such as fillers (preferably inorganic), a plasticizing agent (either metallic or non-metallic) and metallic or non-metallic foraminated materials or the like, such as grids, asbestos cloth with or without wire cores and the like. Of course, it is to be understood that single relatively ductile powdered metals or alloys having relatively high melting points may be employed, or mixtures of powdered metals or alloys having relatively high melting points and characteristics of relatively high ductility may be used.

By relatively high melting point metals I refer to metals or alloys melting above approximately 1000° F., that is above the working temperatures of the body of the friction materials in service, which usually is in excess of approximately 1000° F., and by relatively ductile metals I mean metals or alloys which will readily plasticize and have the ductile characteristics of such metals as soft iron, aluminum, brass, bronze, copper and the like. These metals also fulfill the required conditions as to relatively high melting point. Copper, by virtue of its relatively high melting point and heat conductivity is preferably used, although other metals fulfilling the conditions set forth herein can be employed. The term "soft iron" is employed herein in accordance with its accepted usage to mean substantially pure iron, that is, iron having upper maximum carbon content of about 0.1% and usually in the neighborhood of 0.03 to 0.05%.

When fillers or extraneous friction influencing agents are not used, the basic frictional characteristics of the metal or metals present are predominant in the friction material. Other means of varying the frictional characteristics are desirable, and inorganic additions such as barytes, clay, finely divided silica, asbestos, graphite, litharge, zinc oxide, chopped wire or zinc are contemplated. Additions can be made to augment or decrease the friction in quantities which materially widen the frictional range of the friction element without changing the metallic appearance of the surface. The exact function of these additions in producing friction changes is not definitely known but it is believed that they must become finely admixed in the metallic surface, thus changing the frictional properties. I do not wish to be limited to this hypothesis, since whatever the function of these fillers may be, the desirable widening of the friction range is secured.

The plasticizing agent, when added to the basic mixture of powdered metal and binder appears to assist in obtaining smoother frictional engagement and undoubtedly aids in plasticizing all of the metal present, aiding in a more rapid manifestation of the metallic properties and by assisting in the formation of a substantially uniform metallic film upon the working face of the friction element.

The plasticizing agents which I have found to be most suitable comprise relatively low melting point metals or alloys which will, at least in the severer applications in service, approach the liquid stage. It is advisable that these metals or alloys also be relatively ductile and can be readily plasticized in service. Examples of such metals or alloys are cadmium, zinc, tin, solder, lead or other low melting metals or alloys. Lead is preferable because of its low cost, although others are contemplated since inter-metallic compounds with desirable properties may be formed at the working surface with the higher melting metal. If desired, non-metallic plasticizing agents may be used such as graphite, talc, mica or in general a material possessing lubricating properties at the working temperatures of the friction materail. It is to be understood that there will always be at least approximately 40% of the high melting point metal present irrespective of whether the lower melting metals or other plasticizers are or are not used.

The binders contemplated in my invention comprise any of the well known or suitable heat hardenable or cold setting non-metallic binders now used in conjunction with friction materials to form friction elements, for instance, phenolic resins, rubber, polymerized oil and the like. The amount of binder employed ranges broadly between 5% and 25% by weight of the friction material mix. The lowest amount of binder utilizable depends upon the strength necessary in the friction element and although extremely low quantities of binder may be used, satisfactory strength cannot ordinarily be obtained with the use of less than approximately 5% by weight of the friction material mix. The preferred amount of binder ranges between about 8 to 13%. Above 25% binder, the binder appears to inhibit the formation of the desirable metal film and characteristic metallic appearance, and the desired properties of our friction material are not obtained.

Obviously, the maximum percentage of the high melting point, ductile metal utilizable will depend primarily upon the minimum amount of binder which can be used to produce a friction element of predetermined strength.

The mixture of powdered metal or metals and binder, with or without additional agents, may be used alone but is preferably reinforced with wire or fabric mesh or is integrally secured to woven fabric, fibrous pulp or relatively light metal backing derived from powdered metal. If desired, the powdered metal friction compound may be adhered to a steel plate or to a cast or rolled non-ferrous backing by utilizing resins as an adherent. In other words, working embodiments of my invention contemplate friction elements consisting entirely of the metal powder-binder mix or a skeleton or core construction carrying a working surface or surfaces comprising the metal powder-binder mix.

The range of particle size of the powdered metal is preferably between sieve number 40 and sieve number 325 (National Bureau of Standards, Screen Numbers). However, larger particles than sieve number 40 may be used, but for most efficient functioning of our friction material a particle size smaller than sieve number 40 is recommended.

In constructing the friction material or element employing my powdered metal-binder mix, the relatively high melting point, relatively ductile powdered metal of predetermined fineness is mixed with a suitable non-metallic binder. If desired, of course, a plasticizing agent, friction influencing agent, or reinforcing agent may also be used. The mixture, however, is subjected to pressure of the order of 3,500 pounds per square inch and heated to cure the binder to substantial infusibility. The resulting product is thereafter finished to size and properly sanded.

Of course, as hereinbefore mentioned, the simplest form of my invention comprises a mixture of a relatively high melting point, relatively ductile powdered metal and a non-metallic binder which may be cured to substantial infusibility, the metal being present in amount of approximately 40% by weight of the mix or above. However, as specific examples of typical mixes and constructions which may be made, the following are set forth, not by way of limitation but for purposes of illustration:

*Example I*

| | Per cent |
|---|---|
| Binder | 15 |
| Asbestos | 16.5 |
| Copper powder | 68.5 |

*Example II*

| | Per cent |
|---|---|
| Binder | 10 |
| Copper powder | 70 |
| Tin powder | 7 |
| Lead powder | 13 |

*Example III*

| | Per cent |
|---|---|
| Binder | 10 |
| Asbestos | 20 |
| Copper powder | 56 |
| Tin powder | 6 |
| Lead powder | 8 |

*Example IV*

|  | Per cent |
|---|---|
| Binder | 10.5 |
| Asbestos | 17.5 |
| Copper powder | 68.5 |
| Graphite | 3.5 |

The above mix designated as Example IV is particularly adaptable for friction materials for both passenger automobiles and trucks.

All the friction materials hereinbefore described are finished to blue print dimensions by grinding, punching or machining, using the same tools and set-ups common to the arts. The metallic portion of the finished product may be lapped, burnished or processed to produce a bright metallic appearance which would not be readily distinguishable from the cast metal. In use, the friction surfaces substantially immediately assume a brilliant metallic appearance, and analysis of the surface films often show a metallic content of 85% by weight.

By "friction element" as used in the specification and claims is meant, a clutch facing, brake lining or the like which carries on its working face or faces a friction material comprising our invention. By "friction material or mixture" is meant the mix or matrix comprising the powdered metal and non-metallic binder herebefore described, and is intended to include the plasticizing agents and fillers or lubricants if such are used, but not the skeleton material of the friction element such as the screens, grids, fabrics or asbestos pulp board upon which the friction mixture or material is carried.

I claim as my invention:

1. As a product of manufacture a substantially rigid molded friction element comprising essentially at least 40% by weight of powdered metal selected from the group consisting of soft iron, copper, aluminum, and alloys of copper which are predominantly copper, and between 5 and 25% by weight of a heat hardened organic binder for said powdered metal, said metal being present in sufficient amount to produce a substantially continuous metallic film on the friction surface of said element when said surface is pressed against a relatively moving metal surface.

2. As a product of manufacture a substantially rigid molded friction element comprising essentially at least 40% by weight of powdered metal selected from the group consisting of soft iron, copper, aluminum, and alloys of copper which are predominantly copper, and between 5 and 25% by weight of a heat hardened organic binder for said powdered metal, said metal being present in sufficient amount to produce a substantially continuous metallic film on the friction surface of said element when said surface is pressed against a relatively moving metal surface, said element also containing a powdered filler admixed with said powdered metal.

3. As a product of manufacture a substantially rigid molded friction element comprising essentially at least 40% by weight of powdered metal selected from the group consisting of soft iron, copper, aluminum, and alloys of copper which are predominantly copper, and between 5 and 25% by weight of a heat hardened organic binder for said powdered metal, said metal being present in sufficient amount to produce a substantially continuous metallic firm on the friction surface of said element when said surface is pressed against a relatively moving metal surface, said element also containing a plasticizing agent for said metal, said agent having lubricating properties at the working temperature of the friction element.

4. As a product of manufacture a substantially rigid molded friction element comprising essentially at least 40% by weight of powdered metal selected from the group consisting of soft iron, copper, aluminum, and alloys of copper which are predominantly copper, and between 5 and 25% by weight of a heat hardened organic binder for said powdered metal, said metal being present in sufficient amount to produce a substantially continuous metallic film on the friction surface of said element when said surface is pressed against a relatively moving metal surface, said element also containing a powdered filler and a plasticizing agent for said metal admixed with said metal, said agent having lubricating properties at the working temperature of said friction element.

5. As a product of manufacture a friction element including a substantially rigid backing member and a substantially rigid molded friction facing adherently secured thereto, said friction facing comprising essentially at least 40% by weight of powdered metal selected from the group consisting of soft iron, copper, aluminum, and alloys of copper which are predominantly copper, and between 5 and 25% by weight of a heat hardened organic binder for said powdered metal, said metal being present in sufficient amount to produce a substantially continuous metallic film on the friction surface of said facing when said surface is pressed against a relatively moving metal surface.

6. As a product of manufacture a substantially rigid molded friction element comprising essentially at least 40% by weight of powdered metal selected from the group consisting of soft iron, copper, aluminum, and alloys of copper which are predominantly copper, and between 5 and 25% by weight of a heat hardened organic binder for said powdered metal, said metal being present in sufficient amount to produce a substantially continuous metallic film on the friction surface of said element when said surface is pressed against a relatively moving metal surface, said element having a reinforcing mesh structure positioned therein.

7. As a product of manufacture a substantially rigid molded friction element comprising essentially at least 40% by weight of powdered metal selected from the group consisting of soft iron, copper, aluminum, and alloys of copper which are predominantly copper, and between 8 and 13% by weight of a heat hardened organic binder for said powdered metal, said metal being present in sufficient amount to produce a substantially continuous metallic film on the friction surface of said element when said surface is pressed against relatively moving metal surface.

8. As a product of manufacture a substantially rigid molded friction element comprising essentially at least 40% by weight of powdered copper and between 5 and 25% by weight of a heat hardened organic binder for said powdered copper, said copper being present in sufficient amount to produce a substantially continuous metallic film on the friction surface of said element when said surface is pressed against a relatively moving metal surface.

FREDERICK S. WALKER.